(12) United States Patent
Riedmann

(10) Patent No.: US 7,561,327 B2
(45) Date of Patent: Jul. 14, 2009

(54) DEVICE FOR SETTING THE DIVERGENCE AND/OR CONVERGENCE OF A LIGHT BEAM

(75) Inventor: Juergen Riedmann, Harthausen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/351,066

(22) Filed: Feb. 9, 2006

(65) Prior Publication Data

US 2006/0176549 A1 Aug. 10, 2006

Related U.S. Application Data

(60) Provisional application No. 60/758,767, filed on Jan. 13, 2006.

(30) Foreign Application Priority Data

Feb. 10, 2005 (DE) .................. 10 2005 006 239

(51) Int. Cl.
*G02B 21/32* (2006.01)
(52) U.S. Cl. ..................................... 359/379; 359/380
(58) Field of Classification Search ................. 359/380, 359/379
See application file for complete search history.

(56) References Cited

U.S. PATENT DOCUMENTS 5,825,670 A * 10/1998 Chernoff et al. .............. 702/85
6,188,530 B1 * 2/2001 Katsuragi .................... 359/824
6,232,697 B1 * 5/2001 Mizumoto ................... 310/317

\* cited by examiner

*Primary Examiner*—Joshua L Pritchett
(74) *Attorney, Agent, or Firm*—Darby & Darby

(57) ABSTRACT

An apparatus for setting a divergence and/or convergence of a light beam includes at least one optical component for influencing the divergence and/or convergence of the light beam. A positioning device is provided for positioning the optical component. The positioning device includes at least one piezoelectric element.

13 Claims, 3 Drawing Sheets

Piezo-electrical Tube without a Voltage applied

DEVICE FOR SETTING THE DIVERGENCE AND/OR CONVERGENCE OF A LIGHT BEAM

Priority is claimed to U.S. application Ser. No. 60/758,767 filed Jan. 13, 2006, and to German patent application DE 10 2005 006 239.3, filed on Feb. 10, 2005, the entire subject matters of both of which are hereby incorporated by reference herein.

The present invention relates to a device for setting the divergence and/or convergence of a light beam, particularly in a scanning microscope, comprising at least one optical component that serves to influence the divergence and/or convergence of the light beam and comprising a positioning device for the component.

BACKGROUND

Devices for setting the divergence and/or convergence of a light beam having at least one optical component that serves to influence the divergence and/or convergence of the light beam and having a positioning device for the component are known from actual practice and exist in different embodiments. For instance, in order to set the divergence and/or convergence of a light beam in a microscope, motor-driven mechanical devices are employed to set the position of optical components.

A problematic aspect of the prior-art devices for setting the divergence and/or convergence of a light beam is that the motor-driven mechanical adjustment devices have a regulating speed that is much too slow for many applications. In other words, the optical component cannot be positioned as quickly as would be necessary for the application in question. Moreover, with the known devices, undesired vibrations often occur while the component is being positioned. This means that specimens that are sensitive to vibration often cannot be examined at all.

SUMMARY OF THE INVENTION

Before this backdrop, it is an object of the present invention to provide a device for setting the divergence and/or convergence of a light beam with which the divergence and/or convergence can be set quickly.

The present invention provides a device for setting the divergence and/or convergence of a light beam including at least one optical component that serves to influence the divergence and/or convergence of the light beam and including a positioning device for the component. The positioning device includes at least one piezoelectric element.

It has been recognized according to the invention that piezoelectric elements can advantageously be employed in order to position optical components. Such piezoelectric elements allow an adjustment of optical components at a high speed and virtually without vibrations. By applying a suitable voltage, the component that is coupled to the piezoelectric element can easily be positioned. The imaging behavior of the system can be varied by suitably positioning the component.

Consequently, the device according to the invention for setting the divergence and/or convergence of a light beam constitutes a device that allows a quick setting of the divergence and/or convergence.

In an embodiment of the device, the at least one piezoelectric element could have an essentially tubular area. By applying a voltage, the length of the tubular area can be varied, thus allowing the component to be positioned. Here, the light beam could be guided through the tubular area.

In another embodiment, at least one optical component could be arranged at one end and preferably at both ends of the tubular area. In this context, an arrangement comprising at least one optical component on both ends of the tubular area is particularly advantageous. When a voltage is applied to the piezoelectric element or to the tubular area, the distance between the optical components arranged at both ends changes with respect to each other. This changes the imaging behavior of the entire optical system in which the device is used. To put it more precisely, the tubular area could be lengthened and/or shortened through the application of an electric voltage.

In another embodiment, two piezoelectric elements with tubular areas, for example, could be employed, whereby at least one optical component is arranged on each tubular area. Here, in an advantageous manner, both piezoelectric elements could be controlled with the same electronic driver unit. As a result, the piezoelectric elements would be connected in parallel, so to speak. In any case, the application of a suitable voltage would be able to bring about a change in the distance between the optical components with respect to each other.

The device could be configured in another advantageous manner in such a way that the focal points of the optical components coincide without the application of an electric voltage. In this case, light that enters the tubular area at one end in collimated form then leaves the tubular area at the other end, once again in collimated form. In order to set a convergent or divergent light beam, the tubular area can be lengthened or shortened through the application of a control voltage. In such a situation, the focal points of the optical components no longer coincide, with the result that the light beam is set convergently or divergently after it passes through the tubular area.

In an alternative embodiment, the arrangement of the optical components could be selected in such a way that the focal points of the optical components do not coincide without electric voltage.

In an especially simple embodiment of the device, the optical components arranged at one end and at the other end of the tubular area could have the same focal lengths. In the simplest case, the optical components arranged at one end and at the other end of the tubular area could be designed identically.

In an alternative embodiment, the optical components arranged at one end and at the other end of the tubular area could have different focal lengths. Here, the device could be configured in such a manner that the light beam is expanded when it passes through the tubular area. A beam expander with adjustable divergence could thus be realized.

In an embodiment having a particularly simple design, the at least one optical component could be a lens. Preferably, this could be a positive lens. In an alternative embodiment, the at least one optical component could also be an achromat.

With the device according to the invention, two optical components could be employed in a piezoelectric element configured as a tube or in a tubular area of a piezoelectric element. In comparison to conventional systems, this allows a considerably higher regulating speed since the inertia of the system is markedly reduced while maintaining the same optical effect as with individually actuated optical components. This is essential, for example, in order to adjust the divergence of the light beam in a confocal laser scanning microscope synchronously with the scanning movement of the laser beam. As a result, the field curvature of the microscope objective, for example, can be compensated for by carrying out a z-scan of the laser focus that was generated by the divergence adjustment, a scanning procedure in which the z-scan is coordinated with said microscope objective. Since the device could be structured completely symmetrically, each superordinated system is only subjected to minimum vibrations.

Using the device according to the invention, a z-scan of a focus of the light beam could be carried out in a microscope. As an alternative or in addition to this, the device could be used to perform a correction of a field curvature in the microscope. Also alternatively or additionally, a correction of a longitudinal chromatic aberration or of a field curvature for individual colors could be performed using the device in a microscope.

Fundamentally, the resonance frequency f of a piezoelectric tube having the following proportionality is sufficient:

$$f \sim \sqrt{\text{rigidity/movedweight}}$$

If the length of a piezoelectric tube is cut in half, the rigidity doubles. This results in an increase in the resonance frequency by a factor of 1.4.

Depending on the magnitude of the weight of the "load" added to the piezoelectric tube relative to the weight of the piezoelectric tube, a reduction in the weight of the piezoelectric tube results in a further increase in the resonance frequency. A piezoelectric tube without an external load yields another factor of $\sqrt{2}$ and, in the border-line case of the own weight of the piezoelectric tube being negligible with respect to the external load, the result is only the factor of 1. In other words, an effect is no longer present.

BRIEF DESCRIPTION OF THE DRAWINGS

The teaching of the present invention can be embodied and refined in various ways. The present invention is elaborated upon below based on exemplary embodiments with reference to the drawings. The drawings show.

DETAILED DESCRIPTION

Figure 1:
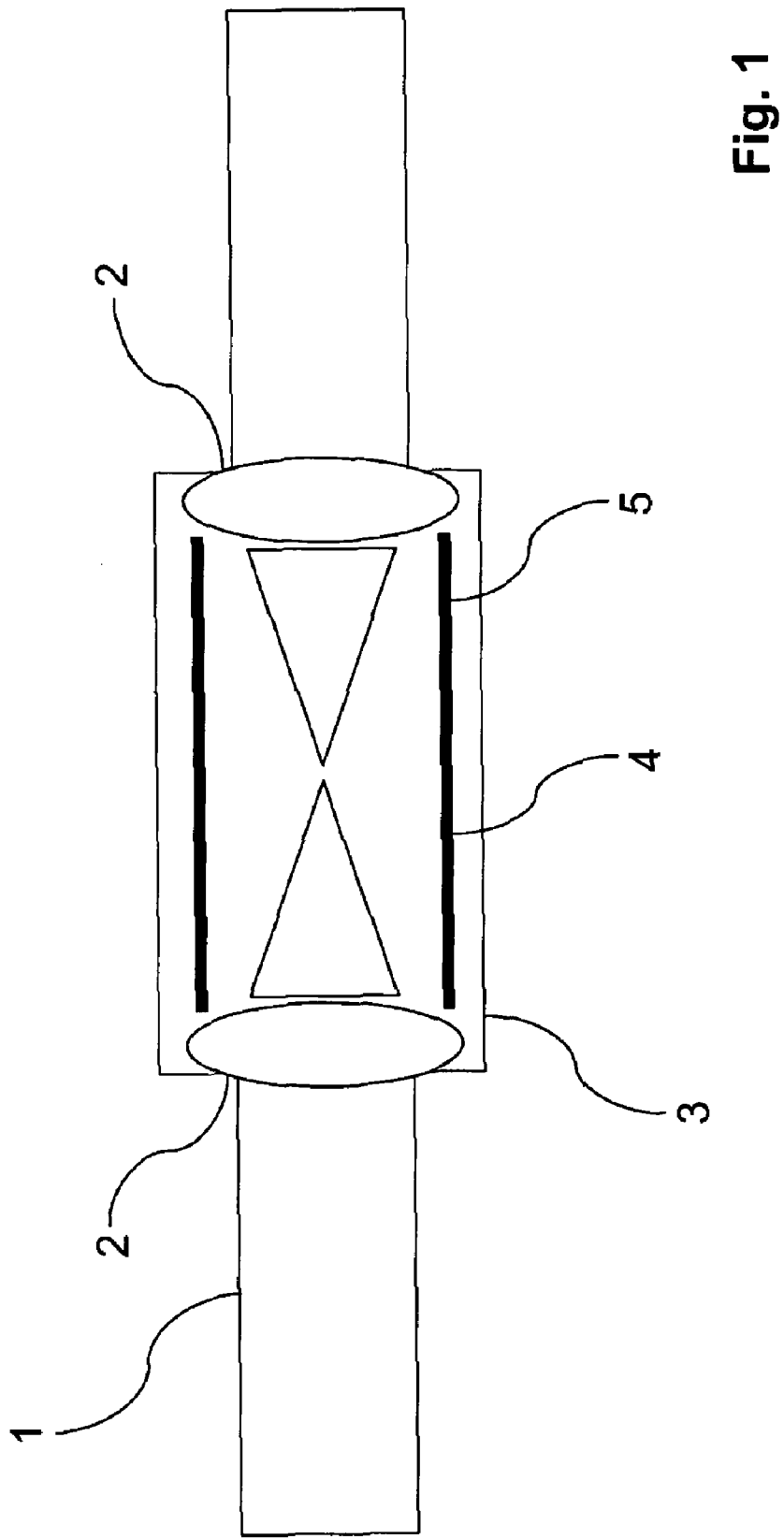
FIG. 1—a schematic side view of an embodiment of a device according to the invention for setting the divergence and/or convergence of a light beam, whereby no voltage has been applied to the piezoelectric element, FIG. 2—a schematic side view of the embodiment according to FIG. 1, whereby the piezoelectric element has been shortened through the application of a suitable voltage, FIG. 3—a schematic side view of the embodiment according to FIG. 1, whereby the piezoelectric element has been lengthened through the application of a suitable voltage.

FIG. 1 shows a schematic side view of an embodiment of a device according to the invention for setting the divergence and/or convergence of a light beam 1. The device can be used especially in a confocal scanning microscope. The device comprises two optical components 2 in the form of positive lenses having identical configurations. The divergence and/or convergence of the light beam 1 is influenced by the lenses. The device also comprises a positioning device 3 for the lenses. With an eye towards achieving a particularly fast setting of the divergence and/or convergence, the positioning device 3 has a piezoelectric element 4. It can set the divergence and/or convergence not only especially quickly but also virtually without vibrations. This is particularly advantageous for applications in microscopy.

The piezoelectric element 4 has an essentially tubular area 5 through which the light beam 1 passes. In other words, a piezoelectric tube is created. The optical components 2 in the form of lenses are arranged at both ends of the tubular area 5. This tubular area 5 can be lengthened and/or shortened by applying an electric voltage. In the embodiment shown in FIG. 1, no voltage has been applied, so that a collimated light beam 1 entering the piezoelectric tube leaves the tubular area once again in collimated form.

Figure 2:
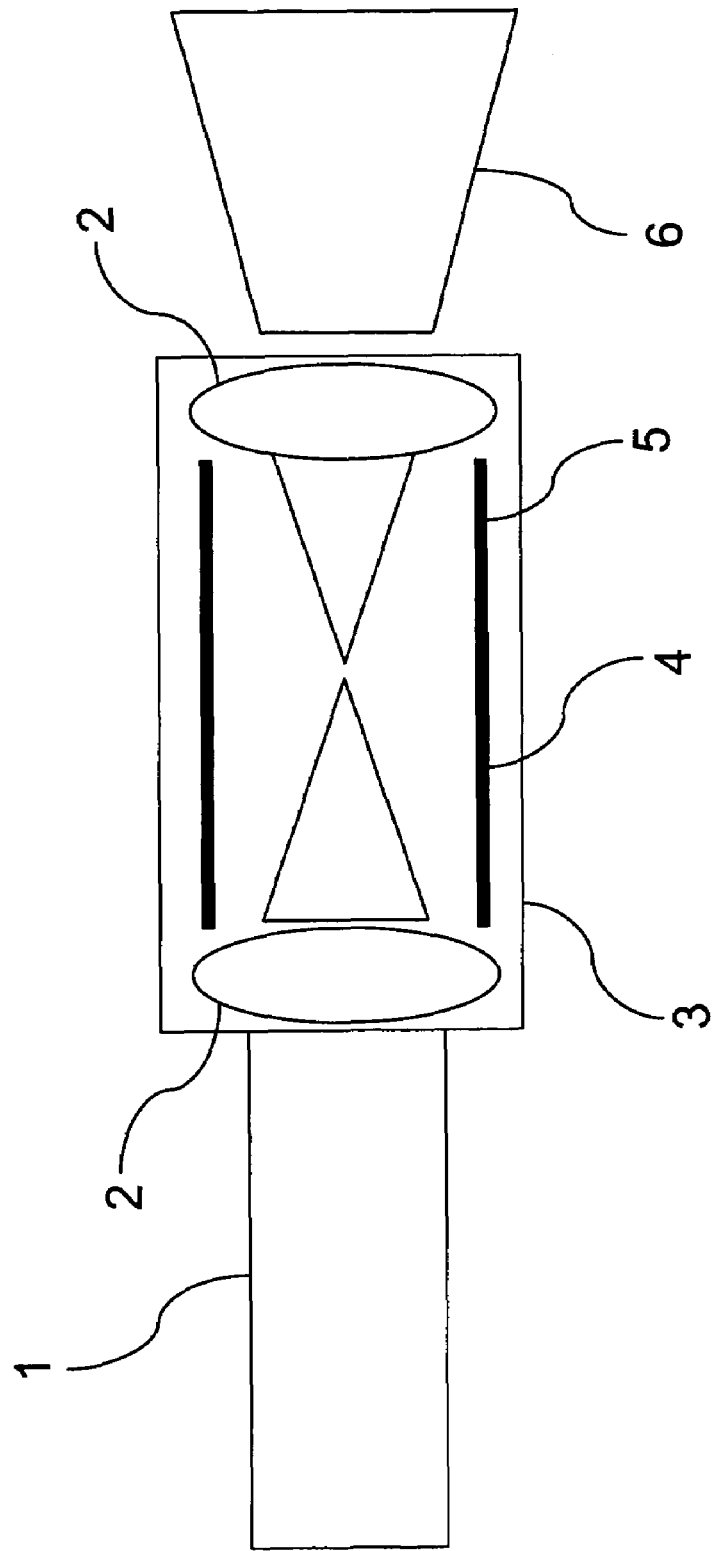
Figure 3:
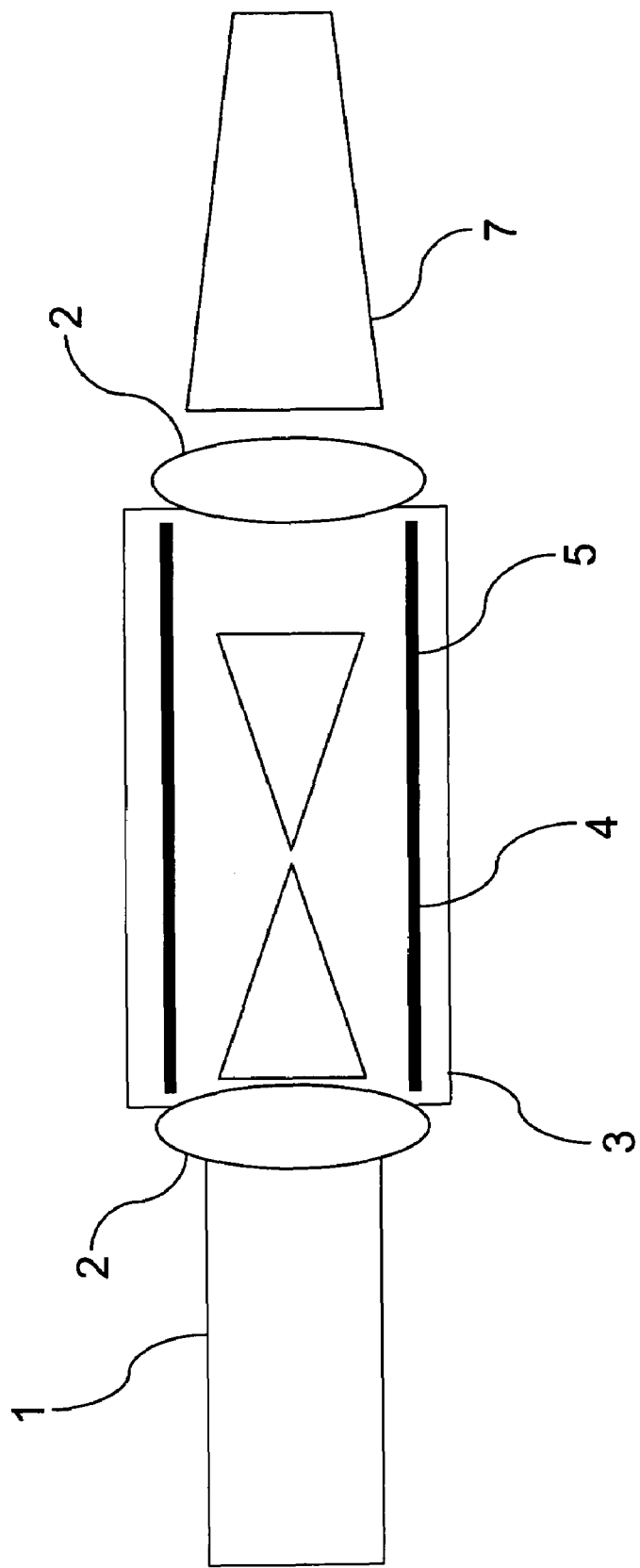

FIGS. 2 and 3 each show the embodiment from FIG. 1 with the application of different voltages to the tubular area 5 which, in FIG. 2, leads to a shortening and, in FIG. 3, to a lengthening of the tubular area 5 or piezoelectric tube. Accordingly, a divergent light beam 6 is generated in the situation shown in FIG. 2, while a convergent light beam 7 is generated in the situation shown in FIG. 3.

Without electric voltage, the focal points of the optical components 2 or positive lenses coincide according to FIG. 1. The two optical components 2 in the form of positive lenses have the same focal lengths.

With the device according to the invention, a z-scan of a focus of the light beam 1 can be carried out in a microscope. Moreover, it is possible to perform corrections of a field curvature and/or of a longitudinal chromatic aberration or of a field curvature for individual colors, for instance, an UV light with a wavelength of 405 nm.

Regarding additional embodiments of the device according to the invention for setting the divergence and/or convergence of a light beam, in order to avoid repetitions, reference is hereby made to the general part of the description as well as to the accompanying claims.

In conclusion, explicit mention should be made of the fact that the embodiment described above merely serve to elucidate the claimed teaching but that the latter should not be construed as being restricted to the embodiment.

What is claimed is:

1. An apparatus for setting a divergence and/or convergence of a light beam, comprising:
   first and second optical components configured to influence the divergence and/or convergence of the light beam; and
   a positioning device configured to position the first and second optical components, the positioning device including a piezoelectric element including a tubular area,
   wherein the first optical component is disposed at a first end of the tubular area,
   the second optical component is disposed at a second end of the tubular area, and
   the piezoelectric element is configured to be at least one of lengthened and shortened by an application of an electric voltage so as to position the optical components relative to each other.

2. The apparatus as recited in claim 1 wherein the light beam is a light beam in a scanning microscope.

3. The apparatus as recited in claim 1 wherein respective focal points of the first and second optical components coincide without the application of the electric voltage.

4. The apparatus as recited in claim 1 wherein respective focal points of the first and second optical components do not coincide without the application of the electric voltage.

5. The apparatus as recited in claim 1 wherein the first and second optical components have respective same focal lengths.

6. The apparatus as recited in claim 1 wherein the first and second optical components have respective same characteristics.

7. The apparatus as recited in claim 1 wherein the first and second optical components have respective different focal lengths.

8. The apparatus as recited in claim 1 wherein the at least one optical component includes a lens.

9. The apparatus as recited in claim 8 wherein the lens is a positive lens.

10. The apparatus as recited in claim 1 wherein the at least one optical component includes an achromat.

11. The apparatus as recited in claim 1 wherein the light beam is a light beam in a scanning microscope, and wherein the positioning device is configured to perform a z-scan of a laser focus of the light beam in the scanning microscope.

12. The apparatus as recited in claim 1 wherein the light beam is a light beam in a scanning microscope, and wherein the positioning device is configured to perform a correction of a field curvature in the scanning microscope.

13. The apparatus as recited in claim 1 wherein the light beam is a light beam in a scanning microscope, and wherein the positioning device is configured to perform a correction of at least one of a longitudinal chromatic aberration and a field curvature for individual colors in the scanning microscope.

* * * * *